United States Patent
Marty et al.

(10) Patent No.: US 9,036,324 B2
(45) Date of Patent: May 19, 2015

(54) LIGHTNING CONDUCTOR SYSTEM COMPRISING A LIGHTNING CONDUCTOR STRIP MOUNTED IN AN OFFSET MANNER

(71) Applicant: Airbus Operations (SAS), Toulouse (FR)

(72) Inventors: Jean-Claude Marty, Toulouse (FR); Jacques Fournie, Grenade sue Garonne (FR); Christophe Bernus, Toulouse (FR); Thony Dupas, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/108,732

(22) Filed: Dec. 17, 2013

(65) Prior Publication Data

US 2014/0166805 A1    Jun. 19, 2014

(30) Foreign Application Priority Data

Dec. 17, 2012   (FR) ...................................... 12 62124

(51) Int. Cl.
| | |
|---|---|
| *H05F 3/00* | (2006.01) |
| *B64D 45/02* | (2006.01) |
| *H02G 13/00* | (2006.01) |
| *H02G 3/32* | (2006.01) |

(52) U.S. Cl.
CPC ................ *B64D 45/02* (2013.01); *H02G 13/40* (2013.01); *H02G 3/32* (2013.01)

(58) Field of Classification Search
CPC ....................................................... B64D 45/02
USPC .................................................. 361/217, 218
See application file for complete search history.

(56) References Cited

U.S. PATENT DOCUMENTS

| 5,542,624 A * | 8/1996 | Smith ........................... 244/1 A |
| 2006/0035507 A1 | 2/2006 | Miles et al. |
| 2010/0276536 A1* | 11/2010 | Lambert et al. ................ 244/1 A |

FOREIGN PATENT DOCUMENTS

| DE | 8715375 | 1/1988 |
| DE | 202010005813 | 8/2010 |
| EP | 0579352 | 1/1994 |
| FR | 2924686 | 6/2009 |
| WO | 2007075141 | 7/2007 |

OTHER PUBLICATIONS

French Search Report, Jul. 9, 2013.

* cited by examiner

*Primary Examiner* — Thienvu Tran
*Assistant Examiner* — Christopher Clark
(74) *Attorney, Agent, or Firm* — Greer Burns & Crain, Ltd.

(57) ABSTRACT

A lightning conductor system for a support structure having an external face intended to be subjected to a flow of air and an internal face opposite the external face, the lightning conductor system comprising an electrically conducting lightning conductor strip, intended to be placed on the side of the internal face of the support structure while being connected to ground, and means of fixing the lightning conductor strip to the support structure, the fixing means comprising fixing studs intended to be inserted into orifices formed in the support structure, said fixing studs being in electrical contact with the lightning conductor strip. The lightning conductor system includes the lightning conductor strip being mounted in an offset manner with respect to the main axes of the fixing studs.

19 Claims, 7 Drawing Sheets

LIGHTNING CONDUCTOR SYSTEM COMPRISING A LIGHTNING CONDUCTOR STRIP MOUNTED IN AN OFFSET MANNER

CROSS-REFERENCES TO RELATED APPLICATIONS

This application claims the benefit of the French patent application No. 12 62124 filed on Dec. 17, 2012, the entire disclosures of which are incorporated herein by way of reference.

TECHNICAL FIELD

The present invention relates to the field of lightning conductor systems. More specifically, it relates to a lightning conductor system for a support structure, a support structure and a radome comprising such a lightning conductor system, as well as an aircraft comprising a radome equipped with said lightning conductor system.

The invention mainly finds application in the field of aeronautics, particularly for the equipment of aircraft radomes.

BACKGROUND OF THE INVENTION

Lightning can cause considerable damage to aircraft in flight, for example civil transport airplanes. In order to protect these aircraft and to minimize the damage that can be caused by lightning, it is known to place lightning conductor protection strips on the radome of aircraft, situated in the nose cone of the fuselage. Generally speaking, said radome makes it possible to protect a radar and, as a result, is typically made of a material permeable to electromagnetic waves, for example an electrically insulating composite material, usually more flexible and more deformable than the structure of the fuselage on which said radome is fixed.

A first type of known lightning conductor protection system consists in placing lightning conductor protection strips, in particular in the form of metal strips, on the external face (or external skin) of the radome. In order to minimize problems of aerodynamics linked to the presence of metal strips on the surface of the radome, these are laid out in a radial manner, starting from the periphery of the radome and aiming towards the tip thereof The metal strips are moreover electrically connected to the ground of the aircraft. Thus, when lightning strikes the radome, the metal strips guide the lightning to the ground of the aircraft.

In order to eliminate any problem of aerodynamics, a second type of lightning conductor protection system in which the metal strips are positioned inside the radome (on the internal skin of the radome) has also been envisaged in the prior art. French patent application FR 2 924 686 A1 describes an example of such a lightning conductor system for aircraft comprising metal strips fixed to the internal face of the radome. The lightning attachment on the radome then operates by means of metal studs flush with the external face of the radome. The metal strips are also laid out in a radial manner on the internal face of the radome.

FIG. 1A represents, in section, an example of such a lightning conductor system 10 of the second type according to the prior art. A metal fixing stud 3, in particular a fixing screw, of principal axis X, connects the external face 1a of the radome 1 to an internal metal lightning conductor strip 2, in particular trapezoidal, provided with a through orifice 8 (visible in FIG. 3A) for the fixing stud 3 and situated on the internal face 1b of the radome 1. The fixing stud 3 is fixed in the wall of the radome 1 via an insert 6 (or cross strut) and a fixing resin 5.

The lightning conductor strip 2 is screwed to the fixing stud 3 by means of a fixing nut 4. Lightning F that strikes the fixing stud 3 on the side of the external face 1a of the radome 1 is guided to the lightning conductor strip 2 situated on the side of the internal face 1b of the radome 1. FIGS. 2A and 3A show in perspective, respectively in an assembled configuration and in an exploded configuration, the lightning conductor system 10 of FIG. 1A, whereas FIG. 4A represents, in frontal view, an example of radome 1 comprising a plurality of lightning conductor systems 10 according to the prior art and FIG. 5A represents an enlarged view of part A of FIG. 4A.

Although this second type of lightning conductor system 10 makes it possible to resolve any aerodynamics problem, this solution is not entirely satisfactory, particularly for the reasons exposed hereafter. In fact, the conception of this lightning conductor system 10 of the prior art generally leads to a complexity in the machining and the assembly of the lightning conductor strips 2 and, as a result, an increase in costs. In particular, the main axes X of the fixing studs 3 are merged with the axes of piercing of the lightning conductor strips 2, so that the fixing studs 3 and the lightning conductor strips 2 are connected together and impose precise tolerances and a complicated assembly of the lightning conductor systems 10. In addition, as may be observed in FIG. 5A, the solution of the prior art may bring about difficulties of localisation during the fixing of the lightning conductor strips 2 on the radome 1. In fact, during assembly, it is necessary to be able to ensure that all of the orifices formed in the wall of the radome 1 for the passage of the fixing studs 3 are opposite orifices formed in the lightning conductor strips 2 and then, in the case of too great a difference, it is sometimes necessary to carry out complex and costly adjustments. Moreover, the lightning conductor strips 2 of this lightning conductor system 10 of the prior art may also exhibit a too important failure of radio-electric barrier vis-à-vis radar waves of the radome 1.

SUMMARY OF THE INVENTION

The aim of the invention is to overcome, at least partially, the aforementioned needs and drawbacks relating to the embodiments of the prior art.

The invention aims particularly to enable a simplification of the assembly and a reduction of the radio-electrical failure of lightning conductor systems equipping a radome.

The invention thus relates to, according to one of its aspects, a lightning conductor system for a support structure having an external face intended to be subjected to a flow of air and an internal face opposite the external face, the lightning conductor system comprising:

an electrically conducting lightning conductor strip, intended to be placed on the side of the internal face of the support structure while being connected to ground, fixing means for fixing studs intended to be inserted into orifices formed in the support structure, said fixing studs being in electrical contact with the lightning conductor strip, characterised in that the lightning conductor strip is mounted in an offset manner with respect to the main axes of the fixing studs.

The lightning conductor system according to the invention may further comprise one or more of the following characteristics taken in isolation or according to any technically possible combinations thereof The support structure may be defined by a radome, particularly an aircraft radome.

The support structure may be a composite structure, particularly a panel comprising a central core made of alveolar material, such as a honeycomb or a foam core. This composite structure may be monolithic, single "sandwich" or "multi-sandwich".

The lightning conductor strip may be intended to be placed on the side of the internal face of the support structure, while being either directly in contact with this internal face, or placed at a distance therefrom.

"Mounted in an offset manner with respect to the main axes of the fixing studs", should particularly be taken to mean that the longitudinal axis of the lightning conductor strip is not inscribed in the plane defined by the main axes of at least two fixing studs. In particular and advantageously, the longitudinal axis of the lightning conductor strip and the main axes of the fixing studs do not intersect.

The fixing means may comprise intermediate elements for the mounting of the lightning conductor strip. Each intermediate element may comprise a body forming part for the fixing thereof to a fixing stud and, projecting laterally from the body forming part, a clamp forming part for the fixing of the lightning conductor strip.

The clamp forming part may comprise two clamp forming branches extending along one another. The two clamp forming branches may each comprise a recess, particularly substantially semi-cylindrical, the two recesses defining a through passage, particularly substantially cylindrical, for the lightning conductor strip.

Each intermediate element may comprise two intermediate parts (or intermediate flanges), superimposed one on top of the other. Each intermediate part may comprise a body forming branch provided with a through orifice, particularly substantially circular, for a fixing stud, the two body forming branches defining the body forming part of the intermediate element, and a clamp forming branch comprising a recess, particularly substantially semi-cylindrical, the two clamp forming branches defining the clamp forming part of the intermediate element. The two recesses may define a through passage, particularly cylindrical, for the lightning conductor strip. The lightning conductor strip may thus be held in "sandwich" between the two recesses.

The two intermediate parts may be strictly identical. Hence, they may be reproducible for all fixations of lightning conductor strip, thereby enabling a saving in terms of costs.

In a variant, the body forming part of the intermediate element may be formed of a single part, from which may extend the two clamp forming branches for fixing the lightning conductor strip.

The fixing studs may be intended to be inserted into orifices formed in the support structure while having their upper part substantially at the level of the external face of the support structure.

"Upper part substantially at the level of the external face of the support structure" is taken to mean that this upper part is at the same level as the external face of the support structure, in other words that the upper end of the fixing stud is at the level of, or is contiguous with, the external face of the support structure within the assembly tolerances.

The fixing studs may be single piece conductive studs comprising in their lower part a portion of threaded rod, intended to pass through the through orifices of the intermediate parts.

The fixing means may further comprise inserts (or cross struts), in particular insulating inserts, to enable the fixing of the fixing studs in the support structure. The inserts may make it possible to assure the mechanical link between the support structure, the fixing studs and the lightning conductor strip. The inserts may be associated with a fixing resin to enable the fixing of the fixing studs. The intermediate elements may bear at least partially on the inserts.

In addition, the fixing means may comprise fixing heads, particularly fixing nuts, to enable the fixing of intermediate elements onto the fixing studs.

The lightning conductor strip may be able to slide relatively to the intermediate elements. Thus, the lightning conductor strip may be independent of the piercing of the orifices in the support structure for the fixing of the fixing studs.

The lightning conductor strip is advantageously devoid of through orifices for a fixing stud.

The lightning conductor strip may be constituted of a multi-strand cable or a cut round bar.

The lightning conductor strip may be substantially cylindrical. In addition, the lightning conductor strip may have a substantially circular section. Hence, in comparison with a lightning conductor strip of the prior art, for example a trapezoidal strip, the impact of radio-electrical failure is lower. In particular, the invention may make it possible to reduce the radio-electrical failure of the lightning conductor strip with respect to the solutions of the prior art by virtue of a substantially circular section which reduces the effects of diffraction of the wave compared to a section of same surface area but rectangular for example.

Thanks to the invention, it may be possible to avoid the constraints of the prior art concerning the localisation of the fixing studs on the support structure relative to the lightning conductor strip. Thus, the assembly tolerances may be increased and the mounting in itself may be considerably simplified thanks to the offsetting of the lightning conductor strip.

The principle of fixing the lightning conductor strip by offsetting according to the invention may thus make it possible on the one hand to simplify the fixing of the lightning conductor strip, and on the other hand to allow the lightning conductor strip to have any type of shape and enable particularly a substantially circular shape.

The invention also relates to, according to another of its aspects, an aircraft support structure, characterised in that it comprises a lightning conductor system as defined previously.

The invention further relates to, according to another of its aspects, a radome characterised in that it comprises a support structure as defined previously, or a lightning conductor system as defined previously, the radome defining the support structure.

The invention also relates to, according to another of its aspects, an aircraft characterised in that it comprises a radome as defined previously.

The radome may in particular be a nose cone radome of the aircraft.

BRIEF DESCRIPTION OF THE DRAWINGS

The invention will be better understood on reading the detailed description given hereafter of a non-limiting example of implementation thereof, and by referring to the figures, schematic and partial, of the appended drawing, in which.

In all of these figures, identical references can designate identical or analogous elements.

In addition, the different parts represented in the figures are not necessarily given to a uniform scale, in order to make the figures easier to read.

DETAILED DESCRIPTION OF THE PREFERRED EMBODIMENTS

An example of implementation of the invention is described hereafter with reference to FIGS. 1B to 5B. FIGS. 1A to 5A, relative to the prior art, have been described previously.

Figure 1A:
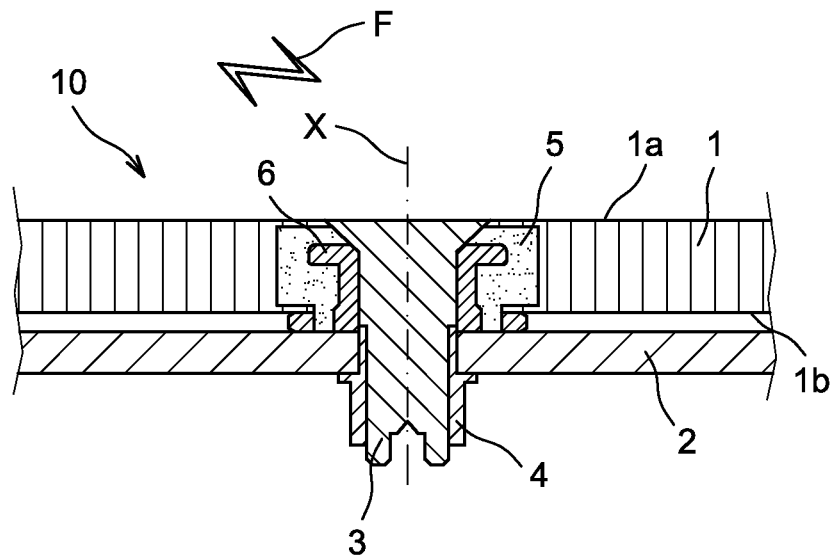
FIG. 1A represents, in section and partially, an example of lightning conductor system according to the prior art.
Figure 1B:
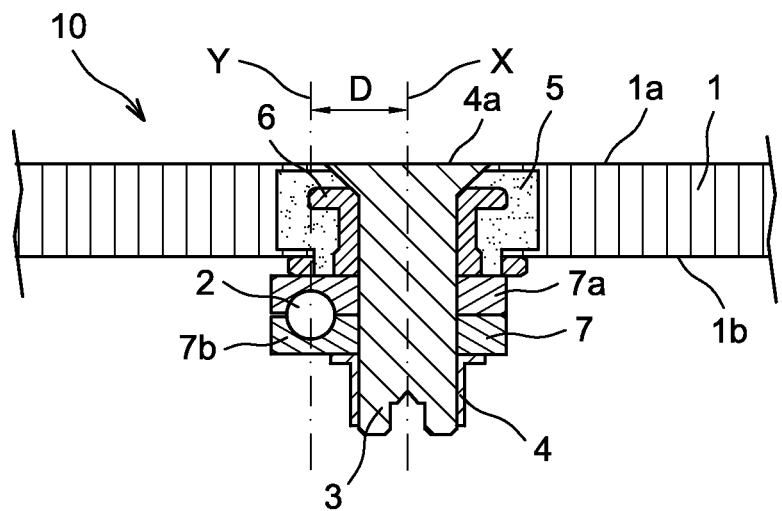
FIG. 1B represents, in section and partially, an example of lightning conductor system according to the invention.
Figure 3A:
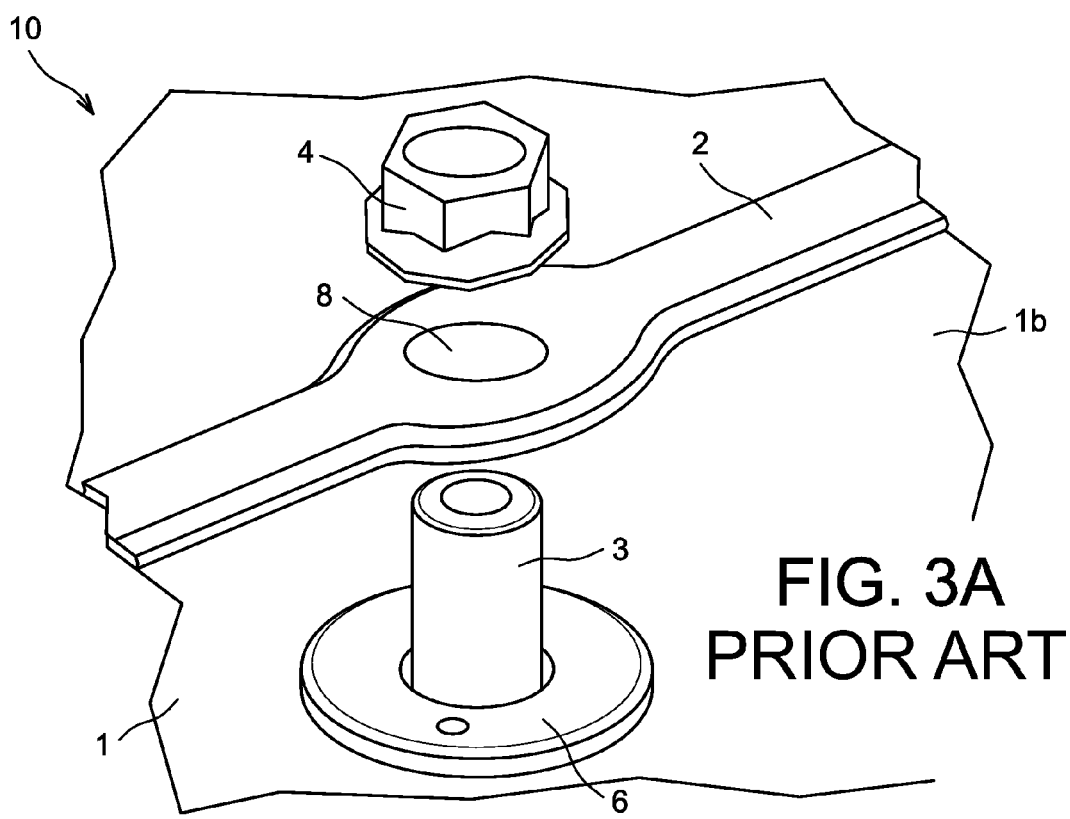

An example of lightning conductor system 10 according to the invention has been represented, in section, in FIG. 1B.

The lightning conductor system 10 is provided to be used in relation with a support structure 1 having an external face 1a, intended to be subjected to a flow of air, and an internal face 1b, opposite to the external face 1a.

The support structure 1 may quite particularly be constituted of a radome 1 of an aircraft, particularly a nose cone radome of the aircraft. The radome 1 may for example comprise a "sandwich" composite structure comprising two walls and a honeycombed central core.

Figure 2A:
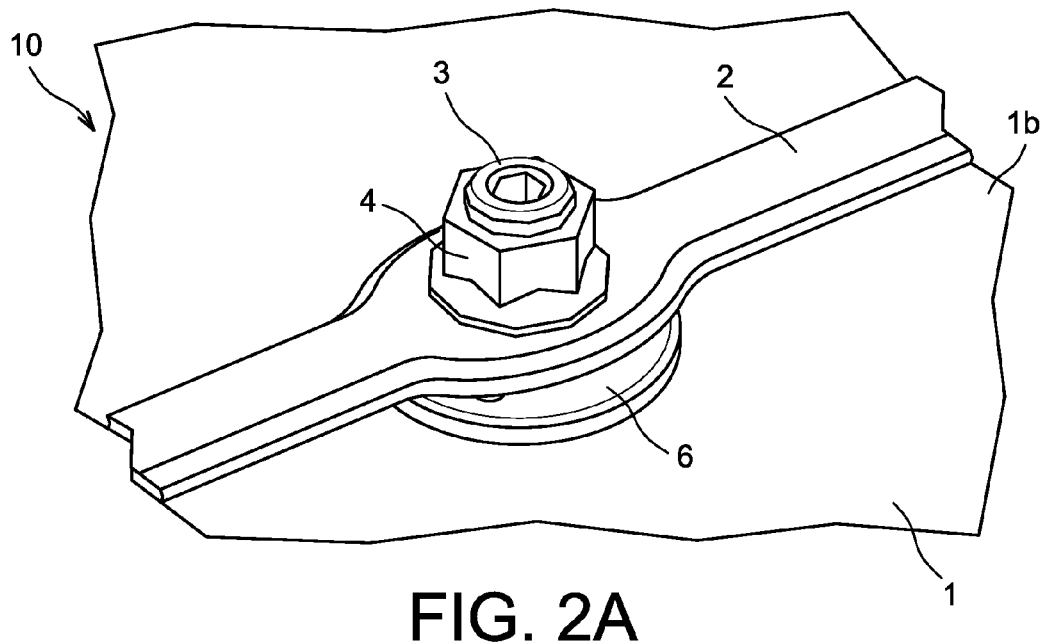
FIGS. 2A and 3A are perspective views of the lightning conductor system of FIG. 1A, respectively in an assembled configuration and in an exploded configuration.
Figure 2B:
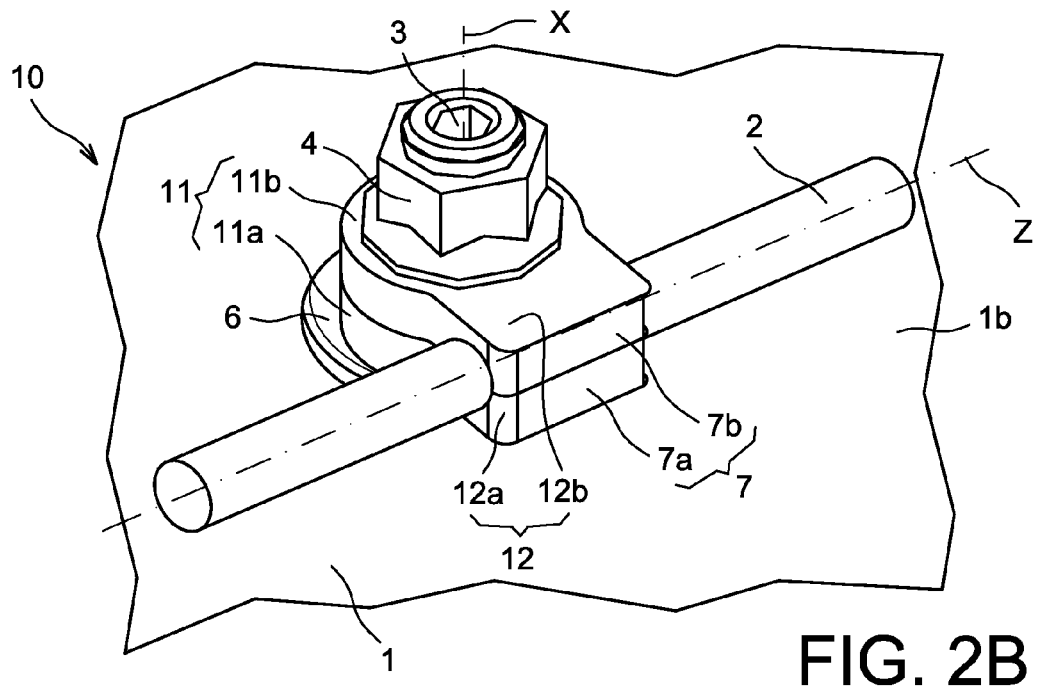
FIGS. 2B and 3B are perspective views of the lightning conductor system of FIG. 1B, respectively in an assembled configuration and in an exploded configuration.
Figure 3B:
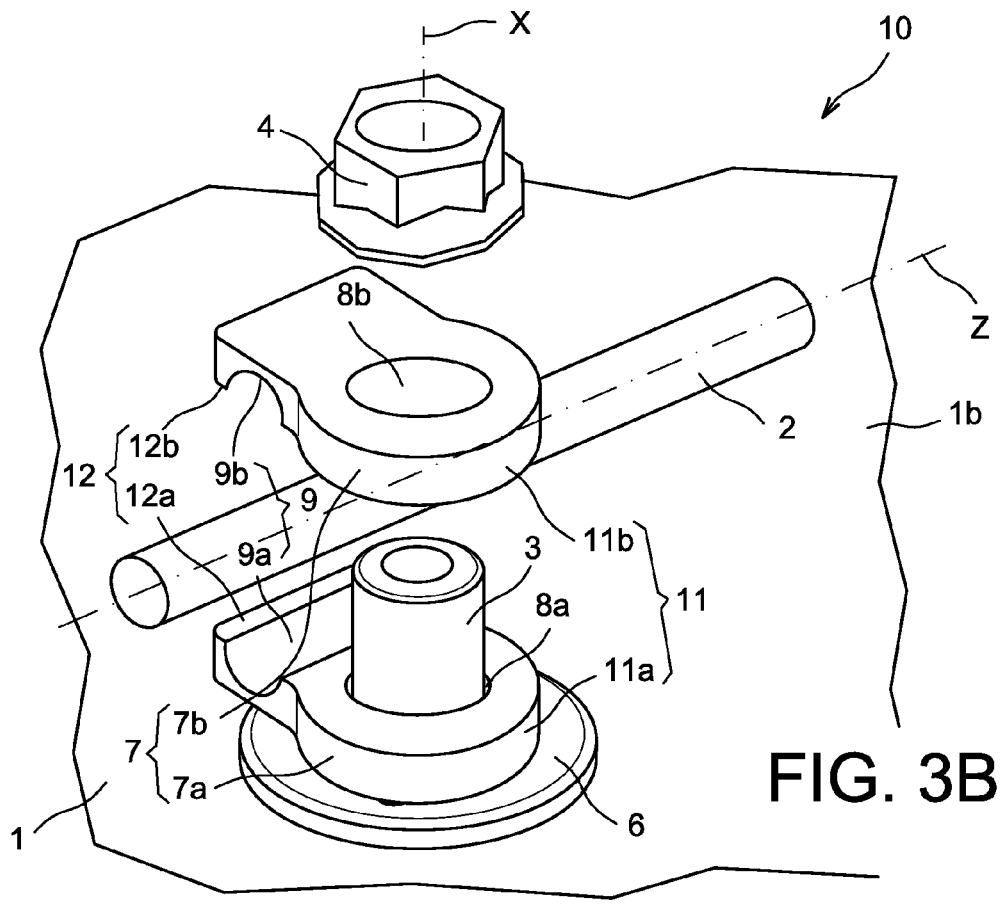

FIGS. 2B and 3B are perspective views of the lightning conductor system 10 of FIG. 1B, respectively in an assembled configuration and in an exploded configuration.

Figure 4A:
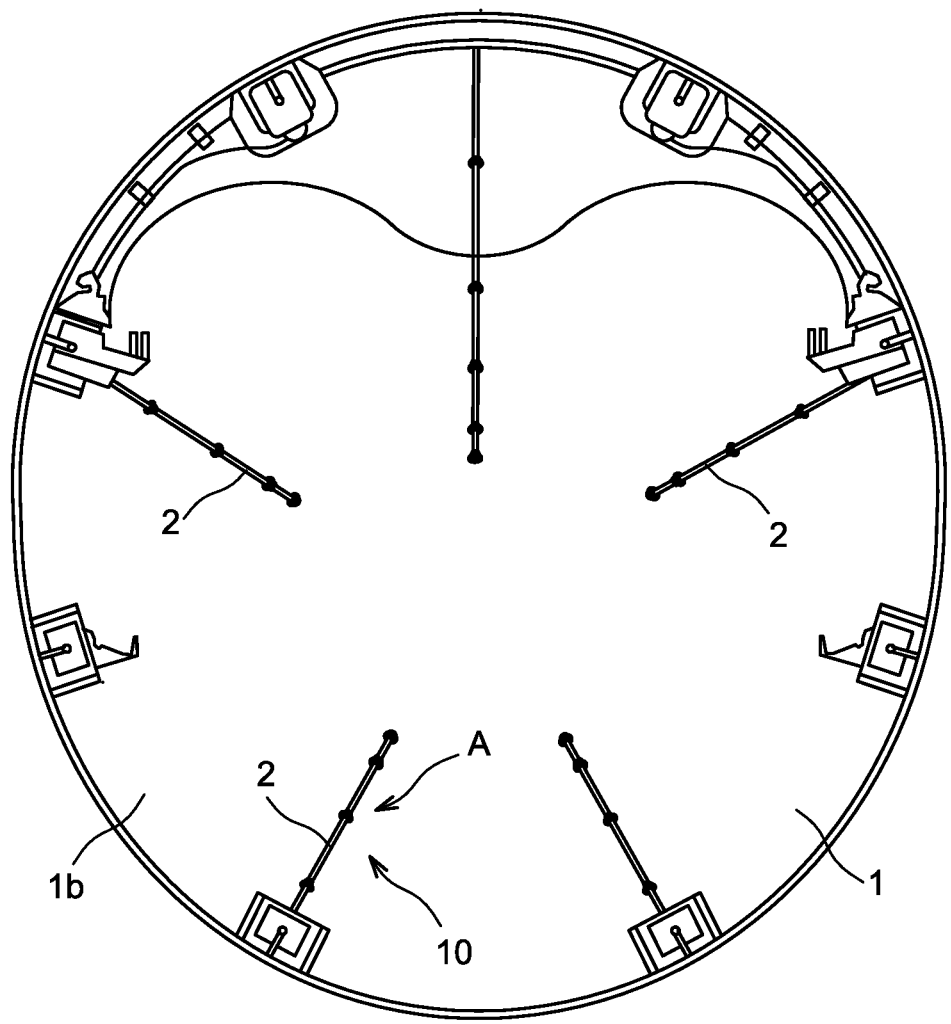
FIG. 4A is a frontal view of a radome equipped with several lightning conductor systems according to the prior art on its internal face.
Figure 4B:
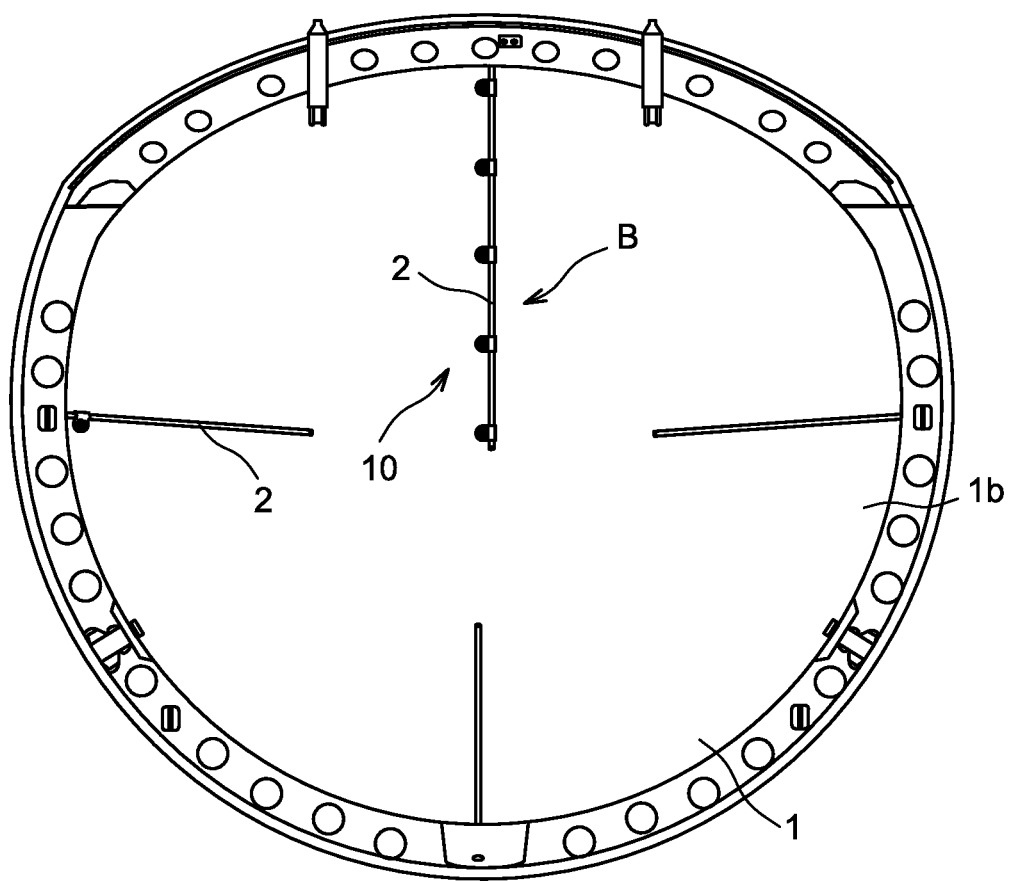
FIG. 4B is a frontal view of a radome equipped with several lightning conductor systems according to the invention on its internal face.
Figure 5A:
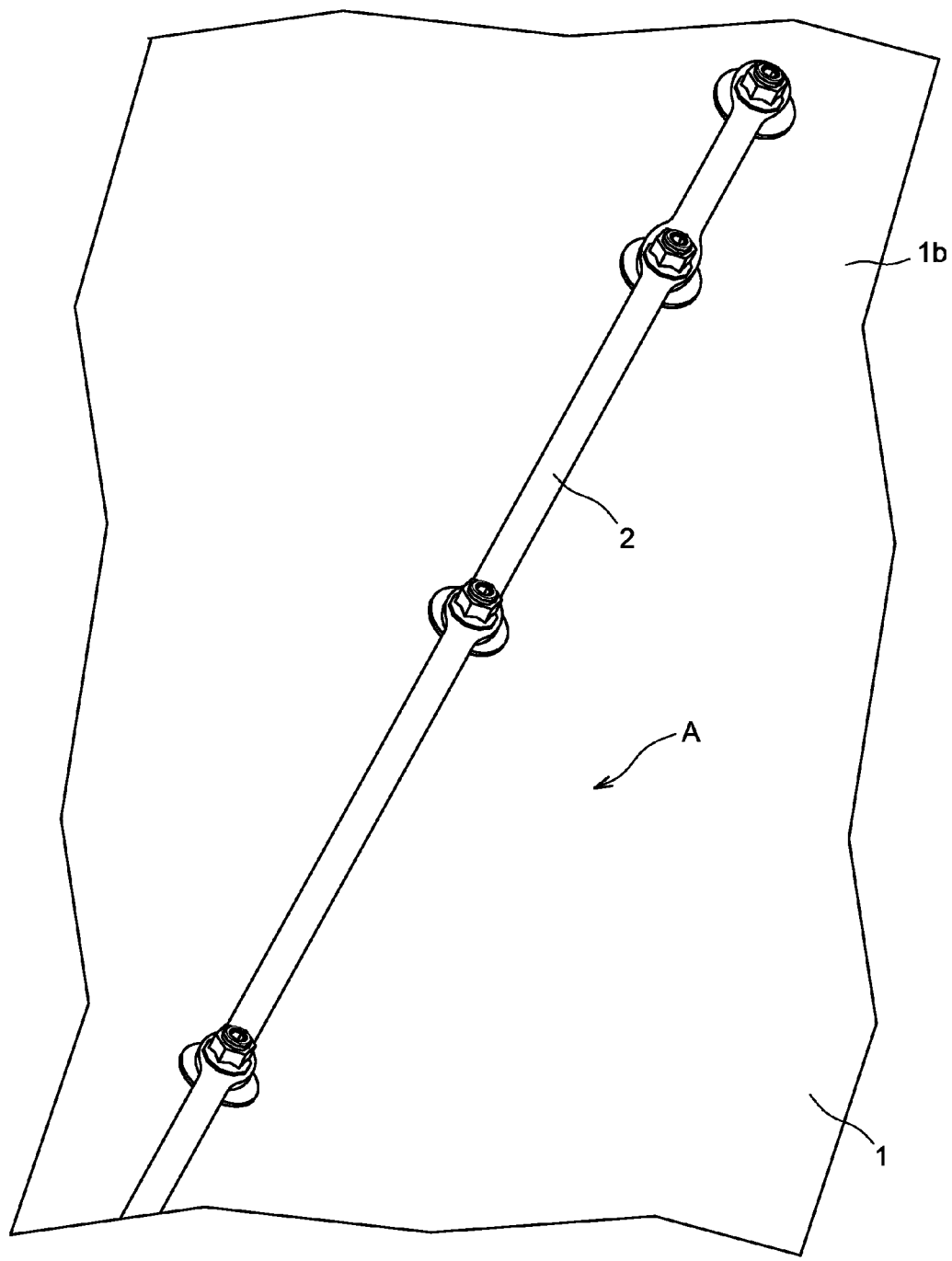
FIG. 5A is an enlarged view of part A of FIG. 4A.
Figure 5B:
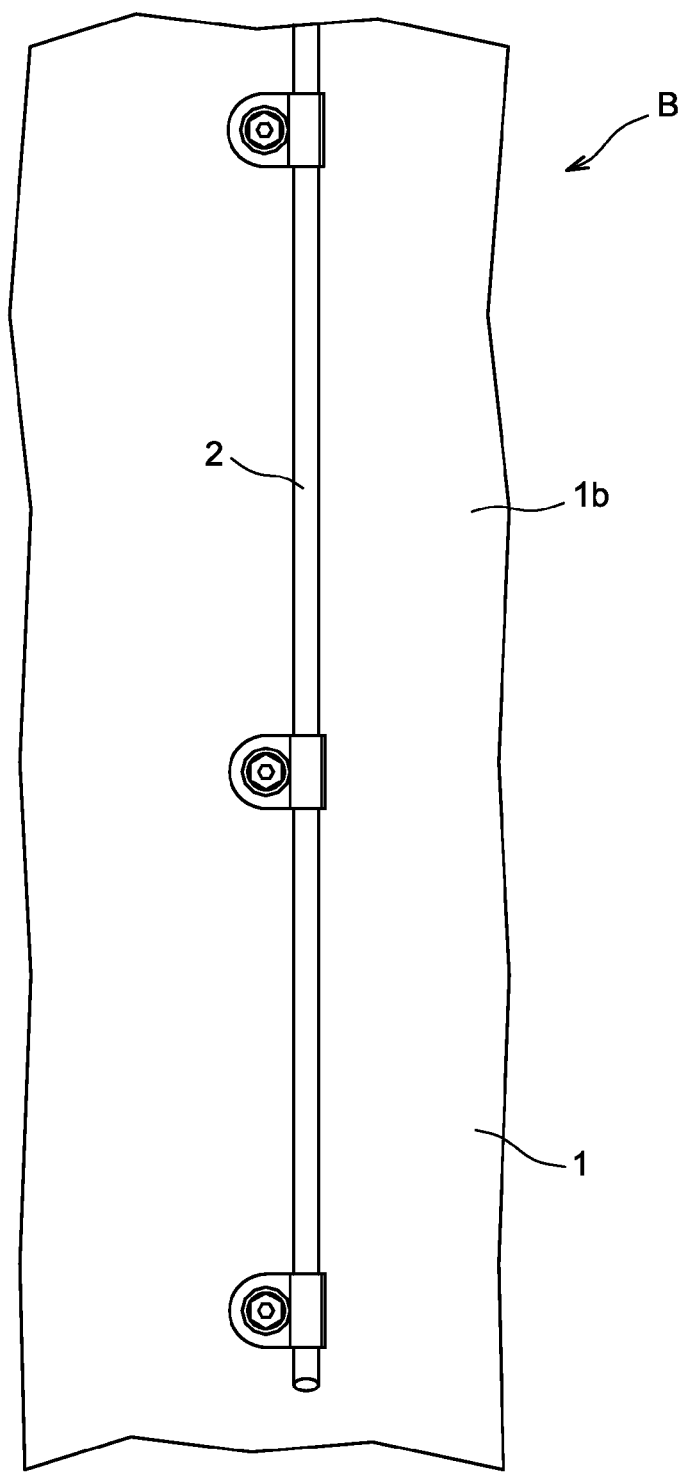
FIG. 5B is an enlarged view of part B of FIG. 4B.

FIG. 4B represents for its part, in frontal view, the radome 1 comprising a plurality of lightning conductor systems 10 according to the invention, and FIG. 5B represents an enlarged view of part B of FIG. 4B.

As may be seen in FIGS. 1B, 2B and 3B, the lightning conductor system 10 comprises an electrically conducting lightning conductor strip 2, of longitudinal axis Z and placed on the side of the internal face 1b of the radome 1. The lightning conductor strip 2 is typically a metal strip, for example made of aluminium or copper. The lightning conductor strip 2 is also connected to the frame of the radome 1 which is itself connected to the nose cone junction of the aircraft, to assure its individual connection to ground. Thus, a lightning arc striking the lightning conductor strip 2 can see its energy evacuated towards ground without affecting any other element of the radome 1.

The lightning conductor system 10 further comprises means of fixing the lightning conductor strip 2 to the radome 1.

In particular, the fixing means comprise fixing studs 3 having main axes X, which are inserted into orifices formed in the radome 1 while having particularly their upper part 4a substantially at the level of the external face 1a of the radome 1. Said fixing studs 3 are in electrical contact with the lightning conductor strip 2, for example by means of an intermediate element 7 as described hereafter. In addition, the fixing studs 3 are fixed in the wall of the radome 1 via inserts 6 and a fixing resin 5.

Lightning that strikes the fixing studs 3 on the side of the external face 1a of the radome 1 may thereby be guided to the lightning conductor strip 2 situated on the side of the internal face 1b of the radome 1.

Furthermore, according to the invention, the lightning conductor strip 2 is mounted in an offset manner with respect to the main axes X of the fixing studs 3. The lightning conductor strip 2 is thereby mounted relatively to the fixing studs 3 such that the longitudinal axis Z of the lightning conductor strip 2 and the main axes X of the fixing studs 3 do not intersect. Hence, as may be seen in FIG. 1B in section, the transversal axis Y of the lightning conductor strip 2, perpendicular to the longitudinal axis Z of the lightning conductor strip 2, is situated parallel to the main axis X of the fixing stud 3, at a non zero distance D.

The offsetting of the lightning conductor strip 2 with respect to the fixing studs 3 may make it possible to facilitate the mounting of the lightning conductor system 10 on the radome 1, particularly without constraint relative to the localisation of the fixing studs 3 with respect to the lightning conductor strip 2.

In addition, the lightning conductor strip 2 is advantageously cylindrical and may thereby enable a reduction of the radio-electrical failure of the lightning conductor strip 2 with respect to the solutions of the prior art.

Furthermore, as may be seen more particularly in FIGS. 2B and 3B, the means of fixing the lightning conductor strip 2 to the radome 1 comprise intermediate elements 7, fixed to the fixing studs 3 by means of fixing nuts 4.

Each intermediate element 7 comprises two intermediate parts 7a and 7b, superimposed one on top of the other.

The two intermediate parts 7a and 7b are advantageously identical to facilitate the reproducibility of the fixing means for several systems lightning conductor 10.

Each intermediate part 7a, 7b comprises a body forming branch 11a, 11b provided with a through orifice 8a, 8b for a fixing stud 3. The two body forming branches 11a and 11b of the intermediate parts 7a and 7b define together a body forming part 11 of the intermediate element 7. In addition, each intermediate part 7a, 7b comprises a clamp forming branch 12a, 12b, on which figures a recess 9a, 9b. The two clamp forming branches 12a and 12b of the intermediate parts 7a and 7b define together a clamp forming part 12 of the intermediate element 7.

The two recesses 9a and 9b define together a through passage 9 for the lightning conductor strip 2, which enables the sliding of the lightning conductor strip 2 relatively to each intermediate element 7. The lightning conductor strip 2 may thus be independent of the piercing of the orifices in the radome 1 for the fixing of the fixing studs 3.

The clamp forming part 12 of each intermediate element 7 is advantageously situated projecting laterally from the body forming part 11 of the intermediate element 7, hence enabling an offsetting of the lightning conductor strip 2 with respect to the fixing studs 3.

Obviously, the invention is not limited to the embodiment example that has been described. Various modifications may be made thereto by those skilled in the art.

In particular, each intermediate element 7 could be provided with a body forming part made of a single part, from which would extend the two clamp forming branches 12a and 12b to form the clamp forming part 12 of the intermediate element 7.

The expression "comprising a" should be understood as being synonymous with "comprising at least one", except if the opposite is specified.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft support structure, having an external face intended to be subjected to a flow of air and an internal face opposite the external face, the support structure comprising a lightning conductor system comprising:
   an electrically conducting lightning conductor strip, placed on the side of the internal face of the support structure while being connected to ground,
   means of fixing the lightning conductor strip to the support structure, the fixing means comprising fixing studs inserted into orifices formed in the support structure, said fixing studs being in electrical contact with the lightning conductor strip,
   the lightning conductor strip being mounted in an offset manner with respect to the main axes of the fixing studs, wherein the longitudinal axis of the lightning conductor strip and the main axes of the fixing studs do not intersect.

2. The support structure according to claim 1, wherein the fixing means comprise intermediate elements for the mounting of the lightning conductor strip, each intermediate element comprising a body forming part for the fixing thereof to a fixing stud and, projecting laterally from the body forming part, a clamp forming part for the fixing of the lightning conductor strip.

3. The support structure according to claim 2, wherein the clamp forming part comprises two clamp forming branches extending along each other, the two clamp forming branches each comprising a recess, the two recesses defining a through passage for the lightning conductor strip.

4. The support structure according to claim 2, wherein each intermediate element comprises two intermediate parts superimposed one on top of the other, each intermediate part comprising a body forming branch provided with a through orifice for a fixing stud, the two body forming branches defining the body forming part of the intermediate element, and a clamp forming branch comprising a recess, the two clamp forming branches defining the clamp forming part of the intermediate element, the two recesses defining a through passage for the lightning conductor strip.

5. The support structure according to claim 2, wherein the lightning conductor strip is able to slide relatively to the intermediate elements.

6. The support structure according to claim 1, wherein the lightning conductor strip is devoid of a through orifice for a fixing stud.

7. The support structure according to claim 1, wherein the lightning conductor strip is cylindrical.

8. The support structure according to claim 1, wherein the lightning conductor strip has a substantially circular section.

9. A radome comprising a support structure according to claim 1.

10. An aircraft comprising a radome according to claim 9.

11. An aircraft support structure, having an external face intended to be subjected to a flow of air and an internal face opposite the external face, the support structure comprising a lightning conductor system comprising:
   an electrically conducting lightning conductor strip, placed on the side of the internal face of the support structure while being connected to ground,
   means of fixing the lightning conductor strip to the support structure, the fixing means comprising fixing studs inserted into orifices formed in the support structure, said fixing studs being in electrical contact with the lightning conductor strip, and wherein the fixing means further comprise intermediate elements for the mounting of the lightning conductor strip, each intermediate element comprising a body forming part for the fixing thereof to a fixing stud and, projecting laterally from the body forming part, a clamp forming part for the fixing of the lightning conductor strip, and,
   the lightning conductor strip being mounted in an offset manner with respect to the main axes of the fixing studs.

12. The support structure according to claim 11, wherein the clamp forming part comprises two clamp forming branches extending along each other, the two clamp forming branches each comprising a recess, the two recesses defining a through passage for the lightning conductor strip.

13. The support structure according to claim 11, wherein each intermediate element comprises two intermediate parts superimposed one on top of the other, each intermediate part comprising a body forming branch provided with a through orifice for a fixing stud, the two body forming branches defining the body forming part of the intermediate element, and a clamp forming branch comprising a recess, the two clamp forming branches defining the clamp forming part of the intermediate element, the two recesses defining a through passage for the lightning conductor strip.

14. The support structure according to claim 11, wherein the lightning conductor strip is able to slide relatively to the intermediate elements.

15. An aircraft support structure, having an external face intended to be subjected to a flow of air and an internal face opposite the external face, the support structure comprising a lightning conductor system comprising:
   an electrically conducting lightning conductor strip, placed on the side of the internal face of the support structure while being connected to ground,
   means of fixing the lightning conductor strip to the support structure, the fixing means comprising fixing studs inserted into orifices formed in the support structure, said fixing studs being in electrical contact with the lightning conductor strip,
   the lightning conductor strip being mounted in an offset manner with respect to the main axes of the fixing studs, and wherein the lightning conductor strip is devoid of a through orifice for a fixing stud.

16. The support structure according to claim 15, wherein the fixing means comprise intermediate elements for the mounting of the lightning conductor strip, each intermediate element comprising a body forming part for the fixing thereof to a fixing stud and, projecting laterally from the body forming part, a clamp forming part for the fixing of the lightning conductor strip.

17. The support structure according to claim 16, wherein the lightning conductor strip is able to slide relatively to the intermediate elements.

18. The support structure according to claim 15, wherein the lightning conductor strip is cylindrical.

19. The support structure according to claim 15, wherein the lightning conductor strip has a substantially circular sention.

* * * * *